United States Patent
Chuang

(10) Patent No.: US 8,060,657 B2
(45) Date of Patent: Nov. 15, 2011

(54) METHOD AND SYSTEM FOR DATA TRANSMISSION BETWEEN DUAL PROCESSORS

(75) Inventor: Feng-Sui Chuang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 323 days.

(21) Appl. No.: 12/238,442

(22) Filed: Sep. 26, 2008

(65) Prior Publication Data

US 2010/0017550 A1 Jan. 21, 2010

(30) Foreign Application Priority Data

Jul. 18, 2008 (CN) .......................... 2008 1 0302801

(51) Int. Cl.
*G06F 15/16* (2006.01)
*G06F 13/42* (2006.01)
*H04J 3/22* (2006.01)

(52) U.S. Cl. ........ 709/253; 709/200; 709/250; 370/469; 710/105

(58) Field of Classification Search .................. 709/230, 709/236–237, 253, 200; 370/469–474; 710/30, 710/105–106
See application file for complete search history.

(56) References Cited

U.S. PATENT DOCUMENTS

| 6,243,759 B1* | 6/2001 | Boden et al. | 709/238 |
| 6,721,333 B1* | 4/2004 | Milton et al. | 370/469 |
| 6,954,797 B1* | 10/2005 | Takeda et al. | 709/236 |
| 2004/0148427 A1* | 7/2004 | Nakhjiri et al. | 709/237 |
| 2004/0205230 A1* | 10/2004 | Fontana et al. | 709/236 |

OTHER PUBLICATIONS

W. Simpson, The Point-to-Point Protocol, RFC 1661, Jul. 1994.*
G. McGregor, The PPP Internet Protocol Control Protocol (IPCP), RFC 1332, May 1992.*
S. Cobb, PPP Internet Protocol Control Protocol Extensions for Name Server Addresses, RFC 1877, Dec. 1995.*

* cited by examiner

*Primary Examiner* — Brendan Higa
(74) *Attorney, Agent, or Firm* — Altis Law Group, Inc.

(57) ABSTRACT

A method and system for data transmission between dual processors are provided. The dual processors include a first processor and a second processor with a controller and a point-to-point protocol (PPP) module. The method includes sending a connection instruction from the first processor to the PPP module, transmitting network configurations from the PPP module to the first processor, and a protocol stack shared by the first processor and the second processor for establishing a connection between the first processor and the PPP module, the protocol stack comprising a new PPP (NPPP) layer, and transmitting data to the PPP module through the connection between the first processor and the second processor.

16 Claims, 4 Drawing Sheets

METHOD AND SYSTEM FOR DATA TRANSMISSION BETWEEN DUAL PROCESSORS

BACKGROUND

1. Field of the Invention

Embodiments of the present disclosure relate to data transmission, and more particularly to a method and system for data transmission between dual processors.

2. Description of Related Art

Currently, portable electronic devices tend to provide various functionalities. One way to speed up execution is to deploy a dual processor architecture. The dual processor architecture employs dual processors including a main processor executing the operation system (OS) and a digital signal processor (DSP) for other applications, such as establishing a network connection.

In a dual processor architecture, the main processor establishes a Point-to-Point Protocol (PPP) connection with the DSP to transmit packets therebetween. The packets are encapsulated on a PPP layer, resulting in a plurality of frames. The frames are then fragmented on a multiplex layer (MUX) resulting in a plurality of fragments to be transmitted. However, time consuming negotiation procedures, such as LCP (Link Control Protocol) and NCP (Network Control Protocol), must be performed before the PPP connection is established. In addition, an additionally time consuming Escape procedure must be performed for the PPP connection if specific characters are to be replaced by others.

Accordingly, a method and system for data transmission between dual processors are called for in order to overcome the limitations described.

SUMMARY

A method for data transmission between dual processors is provided. The dual processors include a first processor and a second processor with a controller and a point-to-point protocol (PPP) module. The method includes sending a connection instruction from the first processor to the PPP module, transmitting network configurations from the PPP module to the first processor, and a protocol stack shared by the first processor and the second processor for establishing a connection between the first processor and the PPP module, the protocol stack comprising a new PPP (NPPP) layer, and transmitting data to the PPP module through the connection between the first processor and the second processor.

Other advantages and novel features of the present method and system for data transmission between dual processors will become more apparent from the following detailed description of preferred embodiments when taken in conjunction with the accompanying drawings.

DETAILED DESCRIPTION OF CERTAIN INVENTIVE EMBODIMENTS

Figure 1:
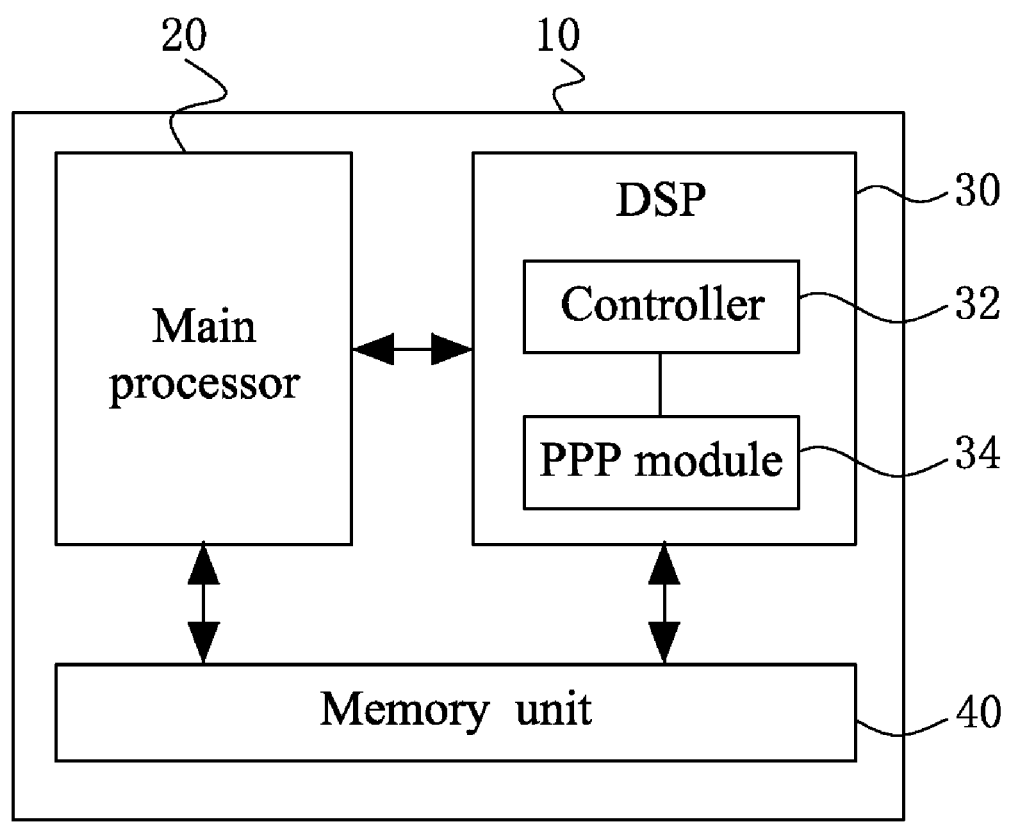
FIG. 1 is a block diagram of an embodiment of a system for data transmission between dual processors.

FIG. 1 is a block diagram of an embodiment of a system 10 installed in an electronic device, such as a mobile phone, for data transmission between dual processors (hereinafter "the system 10"). In one embodiment, the system 10 includes a main processor 20, a DSP 30, a memory unit 40 shared by the main processor 20 and the DSP 30, in addition to other hardware and software components of the electronic device. In other embodiments, portable and non-portable electronic devices other than the mobile phone shown here, such as notebook computers and personal digital assistants (PDAs), for example, may equally utilize the system 10, without departing from the spirit of the disclosure.

The main processor 20 and the DSP 30 communicate through a standard application interface. The main processor 20 controls an operating system and a human-machine interface and executes other procedures. In an embodiment, the DSP 30 processes network-related procedures.

The DSP 30 includes a controller 32 and at least one PPP module 34. The controller 32 receives instructions transmitted by the main processor 20, and dispatches the instructions to corresponding modules. The PPP module 34 establishes a NPPP connection between the main processor 20 and the DSP 30 (described in detail in relation to FIGS. 2 and 3). In addition, the PPP module 34 also establishes a typical PPP connection between the main processor 20 and the DSP 30.

In an embodiment, upon receiving a connection instruction indicating that the main processor 20 intends to establish the NPPP connection, the controller 32 forwards the connection instruction to the PPP module 34. The PPP module 34 then sends a response to the controller 32 in responsive to the connection instruction, thereby confirming the NPPP connection.

The PPP module 34 further transmits relevant network configurations to the main processor 20. In an embodiment, the network configurations include an IP address, a Maximum Receive Unit, a master domain name server, and a slave domain name server, although the disclosure is not limited thereto. The main processor 20 begins transmission of data to the PPP module 34 after the configuration are fully received.

Figure 2:
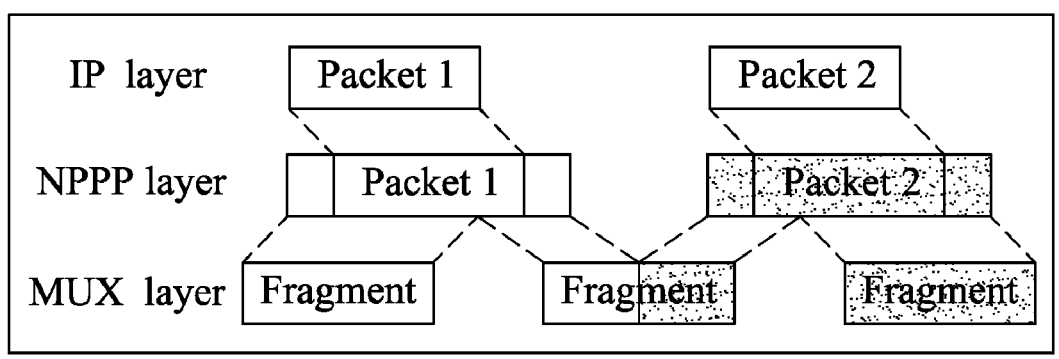
FIG. 2 is a view of an embodiment of a protocol stack of a new point-to-point (NPPP) adopted by the system of FIG. 1.
Figure 3:
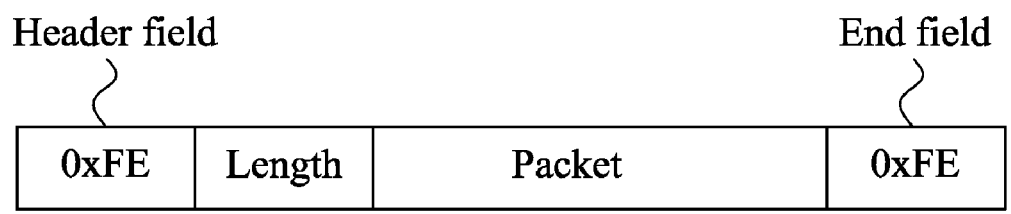
FIG. 3 is a view of a frame format of the NPPP of FIG. 2.

FIG. 2 is a view of an embodiment of the protocol stack of the NPPP adopted by the system 10 of FIG. 1. The protocol stack shared by the main processor 20 and the DSP 30 includes an IP layer, a NPPP layer, and a MUX layer.

Upon initiating a transmission from the main processor 20 to the DSP 30, the IP layer of the main processor 20 packetizes relevant data related to the transmission to at least one packet. The packet is then down forwarded to the next layer, i.e., the NPPP layer. Afterwards, the NPPP layer of the main processor 20 encapsulates the packet to be a frame. The format of the frame is shown as FIG. 3.

The frame of the NPPP layer includes a header field, a length field, the packet, and an end field. In an embodiment, values of the header field and the end field are respectively predefined as "0XFE" and "0xFF." In alternative embodiments, the values of the header field and the end field may be replaced by other values. In addition, a value of the length field indicates a length of the packet.

After the packet is encapsulated to be the frame, the frame is down forwarded to the next layer, i.e., MUX layer. The MUX layer fragments the frames received from the NPPP layer to equal lengths and transmits the fragments to the DSP 30.

Upon receiving the fragments from the main processor 20, the MUX layer of the DSP 30 forwards the fragments to the upper layer, i.e., NPPP layer. The NPPP layer of the DSP 30 combines the fragments into one or more frames according to the value of the length field, and then up forwards the frames to the upper layer, i.e., IP layer. Afterward, the IP layer of the DSP 30 unencapsulates the frames to one or more packets.

Figure 4:
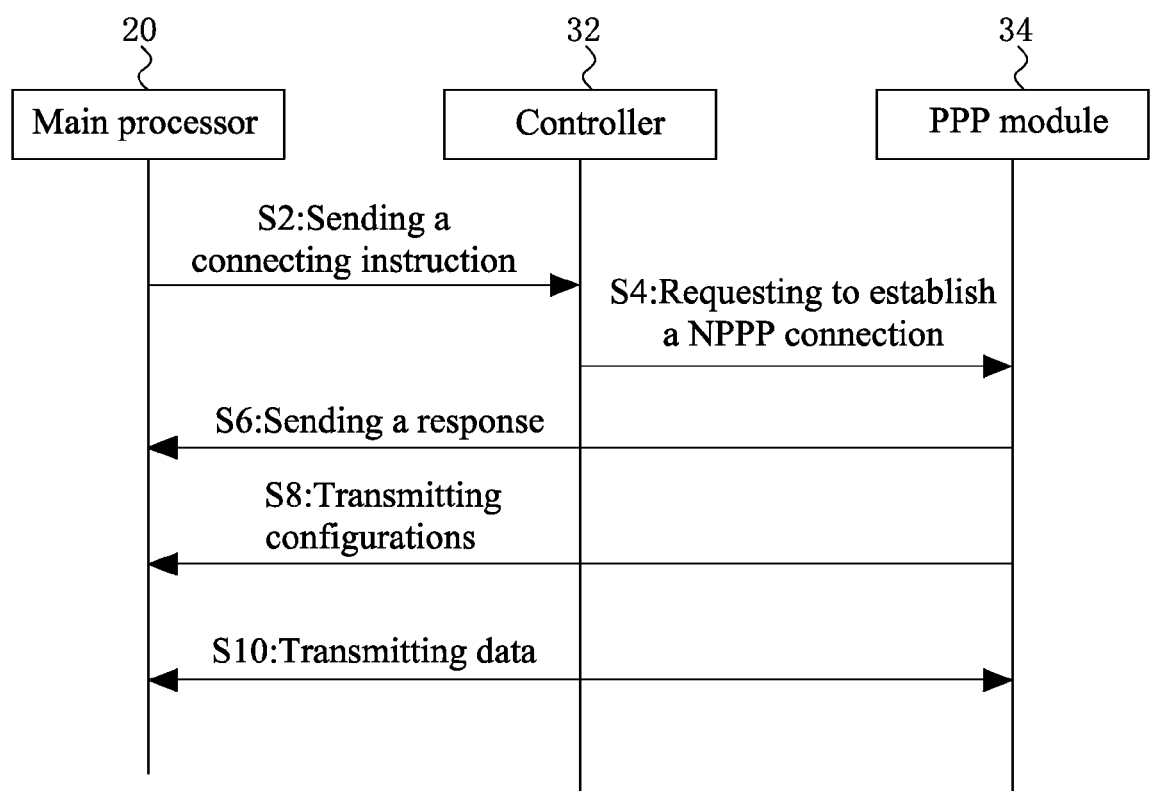
FIG. 4 is a flowchart of an embodiment of a method for data transmission between dual processors.

FIG. 4 is a flowchart of an embodiment of a method for data transmission between dual processors. The method of FIG. 4 may establish the NPPP connection between the main processor 20 and the DSP 30 within the electronic device (e.g., mobile phone). Depending on the embodiment, additional blocks may be added or deleted and the blocks may be executed in order other than that described.

In block S2, the main processor 20 sends the connection instruction to the controller 32. Upon receiving the connection instruction, in block S4, the controller 32 sends the connection instruction to the PPP module 34 requesting the PPP module 34 to establish the NPPP connection. In block S6, the PPP module 34 returns the response to the main processor 20, thereby confirming the NPPP connection.

In block S8, the PPP module 34 further transmits relevant network configurations to the main processor 20. After successfully downloading the network configurations from the PPP module 34, in block S10, the main processor 20 begins to transmit data to the PPP module 34. Detailed procedures of establishment of the NPPP connection and transmission of data between the main processor 20 and the DSP 30 are described in FIG. 2 and FIG. 3.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A computing system for data transmission between dual processors installed in an electronic device, the system comprising a first processor and a second processor, the second processor comprising a controller and a point-to-point protocol (PPP) module, wherein:
    the first processor issues a connection instruction to the controller to initiate a transmission between the first processor and the second processor;
    the controller forwards the connection instruction to the PPP module; and
    the PPP module is configured for transmitting network configurations to the first processor, and establishing a connection with the first processor by a protocol stack shared by the first processor and the second processor, the protocol stack comprising a new point-to-point (NPPP) layer, a IP layer and a MUX layer, the IP layer of the first processor packetizes data to be transmitted to at least one packet, and forwards the at least one packet to the NPPP layer of the first processor.

2. The system as claimed in claim 1, wherein the NPPP layer of the first processor encapsulates the at least one packet to a frame, and forwards the frame to the MUX layer of the first processor.

3. The system as claimed in claim 2, wherein the MUX layer of the first processor fragments the frame, and transmits the fragments to the second processor through the connection between the PPP module and the first processor.

4. The system as claimed in claim 3, wherein the MUX layer of the second processor receives the fragments and forwards the fragments to the NPPP layer of the second processor to be combined to frames by the NPPP layer of the second processor.

5. The system as claimed in claim 4, wherein the NPPP layer of the second processor combines the fragments to frames and forwards the frames to the IP layer of the second processor.

6. The system as claimed in claim 5, wherein the IP layer of the second processor unencapsulates the frames to packets.

7. The system as claimed in claim 4, wherein the frames comprises a header field, a length field, the packet, and an end field.

8. The system as claimed in claim 7, wherein value of the length field indicates the length of the packet, and values of the header field and the end field are predefined.

9. The system as claimed in claim 1, wherein the network configurations include a IP address, a maximum receive unit, a master domain name server, and a slave domain name server.

10. A computing method for data transmission between dual processors installed in an electronic device, the dual processors comprising a first processor and a second processor, and the second processor comprising a controller and a point-to-point protocol (PPP) module, the method comprising:
    issuing a connection instruction from the first processor to the PPP module;
    transmitting network configurations from the PPP module to the first processor; and
    a protocol stack shared by the first processor and the second processor for establishing a connection between the first processor and the PPP module, the protocol stack comprising a new PPP (NPPP) layer, a IP layer and a MUX layer;
    forwarding at least one packet to the NPPP layer of the first processor; and
    encapsulating the at least one packet to a frame.

11. The method as claimed in claim 10, further comprising packetizing transmitted data to at least one packet.

12. The method as claimed in claim 10, further comprising:
    forwarding the frame to the MUX layer of the first processor; and
    fragmenting the frame and transmitting the fragments to the second processor via the connection between the first processor and the second processor.

13. The method as claimed in claim 12, further comprising:
    forwarding the fragments to the NPPP layer of the second processor;
    the NPPP layer of the second processor combining the fragments to a frame;
    forwarding the frame to the IP layer of the second processor; and
    unencapsulating the frame to a packet.

14. The method as claimed in claim 10, wherein the frame comprises a header field, a length field, the packet, and an end field.

15. The method as claimed in claim 14, wherein value of the length field indicates length of the packet, and values of the header field and the end field are predefined.

16. The method as claimed in claim 10, wherein the network configurations include a IP address, a maximum receive unit, a master domain name server and a slave domain name server.

* * * * *